Sept. 16, 1952 W. A. KNOLL 2,610,464
JET ENGINE HAVING FUEL PUMPS DRIVEN BY AIR
TURBINE IN THRUST AUGMENTING AIR DUCT
Filed Feb. 1, 1946
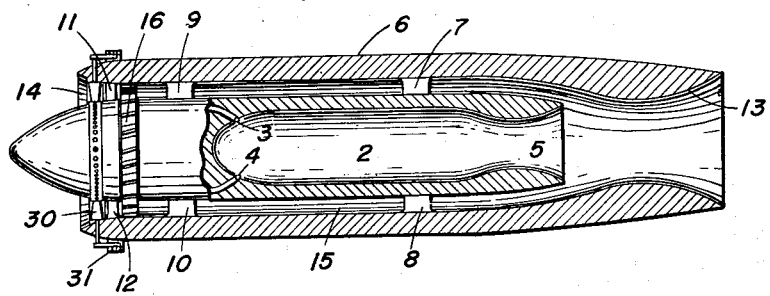
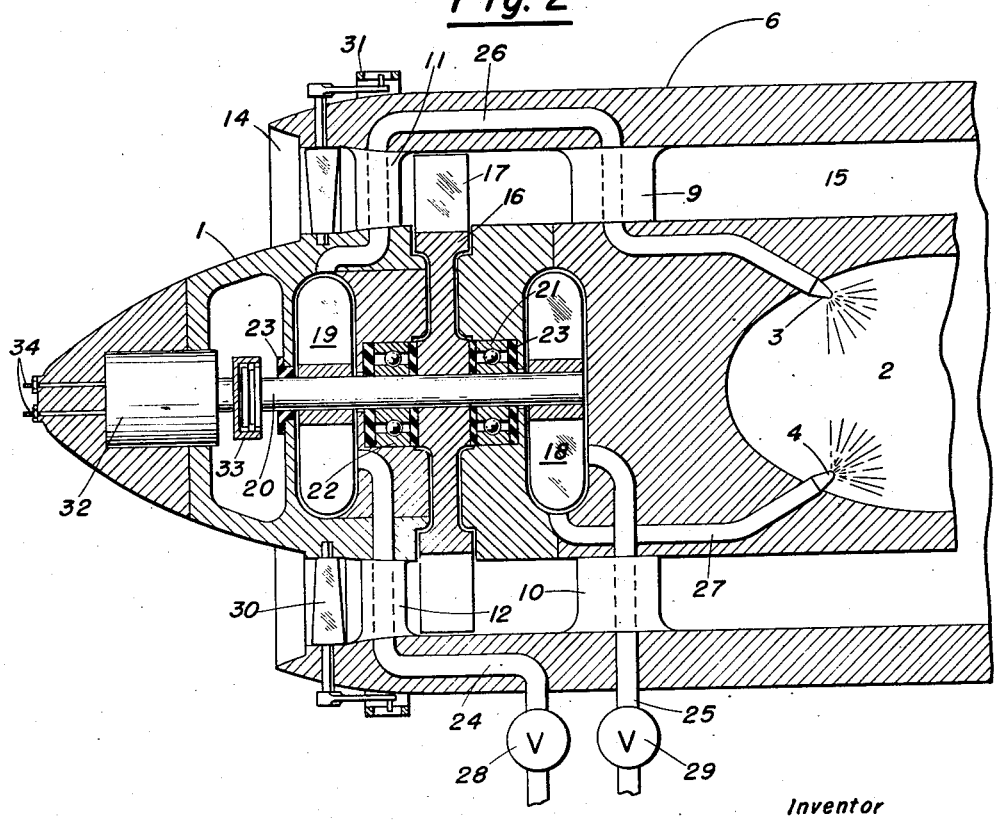
Inventor
William A. Knoll
By
Attorney Patented Sept. 16, 1952

2,610,464

UNITED STATES PATENT OFFICE 2,610,464

JET ENGINE HAVING FUEL PUMPS DRIVEN BY AIR TURBINE IN THRUST AUGMENTING AIR DUCT

William A. Knoll, United States Navy

Application February 1, 1946, Serial No. 644,995

4 Claims. (Cl. 60—35.6)

(Granted under the act of March 3, 1883, as amended April 30, 1928; 370 O. G. 757)

This invention relates to reaction motors for use as propulsion means for aircraft, projectiles, or other movable objects in which motors of this type are adaptable. In particular, it relates to improvements in propellant feed means for such motors.

This invention relates to reaction motors which employ fuels which ignite upon mixing, but it is not limited thereto, being also applicable to jet and turbo-ject motor systems. The fuels must be delivered to a combustion chamber at a predetermined rate to obtain optimum combustion and various devices for supplying fuel have been used in the past. Steam turbines, pressurized tanks for fuel and cumbersome mechanical power transmission devices have been used.

This invention eliminates the foregoing disadvantages by providing a fuel delivery system which is simple in construction, light in weight, and has a minimum of working parts, the critical portions of which are subjected to ambient air temperature.

One of the objects of the invention is to utilize ambient air for operating the feed pumps which deliver the propellants to a combustion chamber.

Another object is to utilize some of the waste heat energy of a reaction motor to increase its thrust.

A further object is to eliminate heavy or complicated ancillary equipment previously employed for pumping propellants.

Further objects and advantages of the invention will become apparent from the detailed description to follow, the accompanying drawing, and the appended claims.

In the drawing:

Fig. 1 is a sectional view of the motor taken on a plane through the longitudinal axis, the portion to the left of the broken line being shown in side elevation.

Fig. 2 is a similar section showing the details of the forward end of the motor.

Referring to the figures, 1 represents a reaction motor having a combustion chamber 2 into which a bi-fuel propellant is delivered by nozzles 3 and 4. Upon mixing in the combustion chamber, the components of the propellant spontaneously ignite and the products of combustion issue from nozzle 5, providing thrust for the unit.

Surrounding the combustion chamber is a casing 6 which supports motor 1 therein by suitable webs or spiders 7, 8, 9, 10, 11, and 12. The rearward portion of the casing forms a nozzle 13, the arrangement of the casing nozzle and combustion chamber being such that they coact to produce an ejector effect when combustion gases issue from nozzle 5. This induces air into mouth 14 of the casing, the air then flowing through duct 15 to mix with the combustion gases in the region of the casing near the nozzle 5. The resulting mixture issues from casing nozzle 13. Since duct 15 surrounds combustion chamber 2, it is apparent that the air passing through the duct will be heated, thus increasing its kinetic energy and adding to the thrust of the gases issuing from the combustion chamber.

Within the casing 6, an air motor is provided, which is illustrated in one of its possible forms as a turbine wheel 16 having blades 17 of the axial flow type. The turbine rotates due to the air flow through duct 15 and it in turn drives propellant pumps 18 and 19. These pumps, as illustrated, are of the centrifugal type but it is apparent that other types could be used if desired. The turbine wheel and pump impellers are mounted on shaft 20 supported on bearings 21 and 22. Suitable shaft packings are illustrated at 23, 23.

The pumps receive propellant through pipes 24 and 25 and deliver it to nozzles 3 and 4 by pipes 26 and 27, respectively. If the propellant were a monopropellant, only one pump together with its supply and delivery pipes would be required. In this case, suitable ignition means would be incorporated within combustion chamber 2.

To control or regulate the thrust of the unit, valves 28 and 29 may be employed which throttle the flow of propellant. These valves, while shown on the supply side of the pumps, could be located on the delivery side if desired.

Alternately, or in combination with the fuel throttling means previously described, a series of air valves 30 may be provided in the mouth, or elsewhere, of duct 15. For simplicity of illustration these valves are shown as a plurality of rotatable plates which may be linked by ring 31 to operate together in much the same manner as the opening or closing of the slats of a Venetian blind, thus controlling the amount of air flow through the turbine which would determine the pump speed and in turn determine the flow of propellant.

Electric motor 32 and overrunning clutch 33 provide a means for starting the device. A suitable source of electrical energy, such as a storage battery, is applied to connections 34 and the pumps and turbines are brought up to a speed sufficient to deliver propellant at desired pressure at which time the propellant may be introduced into the system by valves 28 and 29. After combustion commences, air will be induced into duct 15 increasing the speed of the turbine, if it has not already reached its stable speed for the particular air flow as a result of initial starting by the motor. After combustion commences the electrical source may be disconnected and the pumps may rotate free of the motor by reason of the overrunning clutch.

It is apparent that in place of an overrunning clutch any suitable clutch which would provide a positive disengaging connection between the pumps and motor could be employed. The motor could be eliminated entirely, if desired, and the pumps started by a mechanical connection to an external portable motor in much the same manner as aircraft engines are connected for starting.

In some installations it may be desirable to operate a reaction motor only under certain flight conditions, the motor being inoperative at other times. In this case, starting can be accomplished in the absence of a storage battery or other source of electrical energy, by utilizing the ram effect through duct 13.

The invention described herein may be manufactured and used by or for the Government of the United States of America for governmental purposes without the payment of any royalties thereon or therefor.

What I claim is:

1. A reaction motor comprising an elongated combustion chamber having a tapered constriction forming a nozzle at the rearward end thereof, a casing surrounding and annularly spaced from the combustion chamber to provide an annular duct contiguous with the outer wall of the combustion chamber, one end of said casing adapted to form an air scoop forwardly and the other end adapted to discharge air from said duct rearwardly with gases emerging from said nozzle of said combustion chamber, an axial flow turbine having a shaft rotatably mounted axially ahead of the combustion chamber and having blades disposed in said annular duct, where air entering the duct through said scoop will drive the turbine, and pump means on said turbine shaft for delivering propellant to the combustion chamber, the rearward end of said housing having a tapered constriction forming a nozzle in line with and adjacent the combustion chamber nozzle whereby the normal outflow of gases from said combustion chamber is accelerated.

2. A liquid propellant reaction motor comprising an elongated annular housing defining an air duct, a combustion chamber supported axially within said housing and having a rearwardly directed discharge nozzle positioned within said housing, an air driven turbine having a shaft rotatable in said housing and having peripheral blades operating in said duct, a propellant pump connected to said turbine, a conduit connecting said pump to a source of propellant, a conduit connecting said pump to said combustion chamber, and single valvular means for regulating simultaneously both air flow through said duct and propellant through said conduit whereby a balanced cooling effect on the wall of said combustion chamber is secured.

3. The reaction motor as defined in claim 1 with additional means including valved ports in said duct upstream of said turbine for controlling simultaneously the rate of supply of air to said housing nozzle and the rate of supply of propellant to said combustion chamber.

4. A liquid propellant reaction motor comprising an elongated annular housing having a terminal constriction forming a rear nozzle and defining an air duct, a combustion chamber supported axially within said housing and having a nozzle positioned within said housing upstream of said housing nozzle, the space between said combustion chamber and said housing forming an air duct, an air driven turbine having a shaft rotatable in said housing and having peripheral blades movable in said duct, a propellant pump connected to said turbine, a conduit connecting said pump to a source of propellant, a conduit connecting said pump to said combustion chamber, valve means for fixing the mass supply of propellant to said combustion chamber and additional valve means including valved ports in said duct upstream of said turbine for regulating the rate of supply of propellant to said combustion chamber and the rate of air supply to said housing nozzle.

WILLIAM A. KNOLL.

REFERENCES CITED

The following references are of record in the file of this patent:

UNITED STATES PATENTS

| Number | Name | Date |
|---|---|---|
| 1,103,503 | Goddard | July 14, 1914 |
| 1,369,672 | Koenig | Feb. 22, 1921 |
| 1,815,097 | Davidson | July 21, 1931 |
| 2,400,714 | Rowledge et al. | May 21, 1946 |
| 2,410,538 | Walton | Nov. 5, 1946 |
| 2,455,845 | Wells | Dec. 7, 1948 |
| 2,483,045 | Harby | Sept. 27, 1949 |
| 2,531,761 | Zucrow | Nov. 28, 1950 |
| 2,540,594 | Price | Feb. 6, 1951 |
| 2,563,270 | Price | Aug. 7, 1951 |
| 2,566,319 | Deacon | Sept. 4, 1951 |

FOREIGN PATENTS

| Number | Country | Date |
|---|---|---|
| 525,420 | Great Britain | Aug. 28, 1940 |
| 842,254 | France | Feb. 27, 1939 |
| 554,906 | Germany | Nov. 2, 1932 |

OTHER REFERENCES

"Astronautics," Journal of the American Rocket Society, No. 34, June 1936, pages 8 to 13.